United States Patent [19]

Ishibai

[11] Patent Number: 4,650,297
[45] Date of Patent: Mar. 17, 1987

[54] BINOCULAR OPTICAL SYSTEM WITH AUTOMATIC FOCUSING MECHANISM

[75] Inventor: Isao Ishibai, Tokyo, Japan

[73] Assignee: Hoya Corporation, Tokyo, Japan

[21] Appl. No.: 860,301

[22] Filed: Jan. 19, 1984

Related U.S. Application Data

[63] Continuation of Ser. No. 245,840, Mar. 20, 1981, abandoned.

[30] Foreign Application Priority Data

Mar. 21, 1980 [JP] Japan ................................. 55-34885

[51] Int. Cl.$^4$ .................... G02B 7/11; G02B 23/02; G02B 7/06
[52] U.S. Cl. .................................. 350/556; 350/564; 354/405
[58] Field of Search ............... 350/556, 555, 564, 563; 354/405, 406, 404; 250/201

[56] References Cited

U.S. PATENT DOCUMENTS

| | | | |
|---|---|---|---|
| 4,083,056 | 4/1978 | Nakamura et al. | 250/201 |
| 4,136,939 | 1/1979 | Abe | 354/25 P |
| 4,262,988 | 4/1981 | Ishibai et al. | 350/47 |
| 4,284,325 | 8/1981 | Ishibai et al. | 350/47 |

FOREIGN PATENT DOCUMENTS 38532  3/1980  Japan ................................. 350/556

Primary Examiner—Jon W. Henry
Attorney, Agent, or Firm—Sughrue, Mion, Zinn, Macpeak, and Seas

[57] ABSTRACT

Auto-focus binoculars in which only the center portion of the image viewed through the ocular lenses of the binoculars is used for focusing. Light admitting windows are formed adjacent right and left objective lenses of the binoculars. Light from the light admitting windows is reflected by fixed and movable reflex members through long focal length lenses onto a focus detecting module. The movable one of the reflex members is reciprocated by a motor until an output signal from the focus detecting module indicates that focusing has been achieved.

7 Claims, 1 Drawing Figure

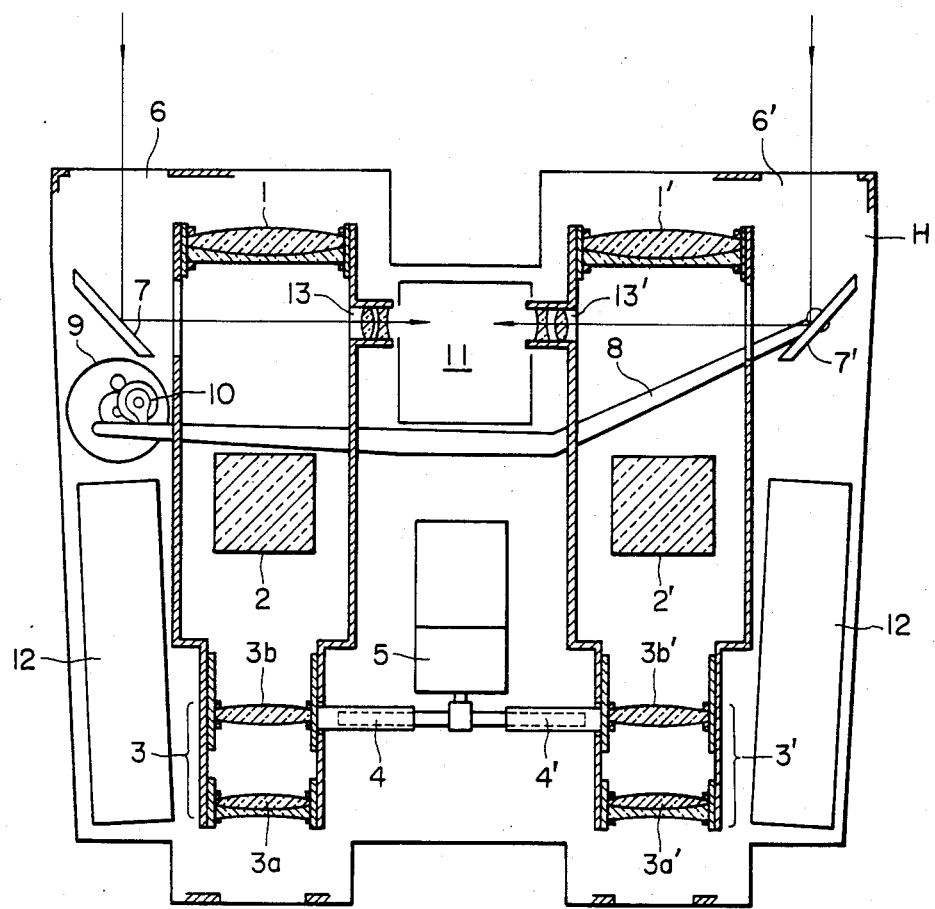

BINOCULAR OPTICAL SYSTEM WITH AUTOMATIC FOCUSING MECHANISM

This application is a continuation of application Ser. No. 245,840, filed 3/20/81, now abandoned.

BACKGROUND OF THE INVENTION

The present invention relates to binoculars with an automatic focusing mechanism in which each of right and left objectives is provided with a light admitting window close thereto and independent thereof. Light entering through each light admitting window is introduced to a focus detecting element module through a movable reflex structure or a fixed reflex structure and a lens having a long focal length or a non-focus or afocal optical system attachment.

In ordinary binoculars, it is troublesome to manually rotate an adjustment ring for oculars to thereby achieve the focusing of the binoculars. Moreover, this manual operation is not accurate. In order to overcome these problems, heretofore auto-focus binoculars have been proposed in which light reflected by a fixed reflex structure and a movable reflex structure is introduced into a focus detecting element module and the oculars are moved in accordance with control signals generated in the module to thereby automatically perform the focusing operation. However, in such binoculars, light entering through the objectives is divided into ocular light and focus detecting element module light. As a result, the intensity of the image viewed through the oculars is reduced and at the same time the light supplied to the focusing detecting element module is insufficient and hence a desired focusing accuracy cannot be obtained in low light situations.

With the intention of overcoming these difficulties, the present applicant has proposed, in U.S. Pat. No. 4,262,988 filed on Dec. 28, 1979, binoculars having an automatic focusing mechanism in which, in order to provide both a fixed reflex structure and a movable reflex structure with a sufficient amount of light, right and left object-distance metering windows are formed independent of right and left objectives, respectively. However, in such binoculars, light reflected by the fixed reflecting member and the movable reflecting member is directly introduced to the focus detecting element module. Since the field angle of the binoculars is rather narrow in comparison with that of a camera, light from most of the view field (70% or more) is introduced into the module resulting in incorrect focusing as a whole. Therefore, it is impossible to focus a desired object on the image plane. Namely, if a large object upon which it is not desired to focus is positioned in the same field as a relatively small object upon which focusing is desired to be carried out, most of the view field is occupied by the large object. Even if the desired object is positioned in the middle of the view field, it is difficult to achieve desirable focusing in such a condition.

SUMMARY OF THE INVENTION

In order to overcome the above noted defects, the present invention provides binoculars in which each of right and left objectives is provided with a light admitting window close thereto and independent thereof. Light entering through each light admitting window is introduced to a focus detecting element module to thereby produce a control signal. The oculars are moved by a control signal. Optical means having a long focal length or afocal optical attachment are disposed between the module and the fixed and movable reflex structures whereby, when the distance to the object to be viewed is varied, only light from the center of the view field of the binoculars is introduced to the module to thereby enable focusing with a high accuracy.

BRIEF DESCRIPTION OF THE DRAWINGS

The single FIGURE is a horizontal cross-sectional view of binoculars with an automatic focus detecting mechanism according to the present invention.

DESCRIPTION OF THE PREFERRED EMBODIMENTS

The present invention will now be described with reference with the single drawing FIGURE. In the FIGURE, reference numerals 1 and 1' denote left and right objectives, reference numerals 2 and 2' denote prism systems disposed in lens barrels, and reference numerals 3 and 3' denote ocular optical systems, respectively. In each ocular optical system, at the outermost portion of the housing H of the binoculars, a fixed ocular lens 3a or 3a' is provided, and at the inner portion thereof an ocular lens 3b and 3b' movable relative to the housing H is provided. The movable ocular lenses 3b and 3b' are connected to an output shaft of an ocular lens drive motor 5 through drive rods 4 and 4' by a suitable gear structure and are moved by rotation of the drive motor 5 to thereby vary the front focal position of the overall ocular system 3 or 3'.

Light admitting windows 6 and 6' for metering the distance from the binoculars to the object are provided beside the left and right objectives 1 and 1' in the binocular housing H. It is desired that, as shown in FIG. 1, the light admitting windows be positioned symmetrically with respect to the center line of the binoculars. In the specific embodiment described, the windows are formed outside of the objectives. However, it is possible to place the windows upward or downward of the objectives or inside of the objectives.

Reflex members 7 and 7' are disposed rearward of the light admitting windows 6 and 6'. One of the reflex members is formed as a fixed reflex member 7 and the other is formed as a movable reflex member 7'. With respect to the movable reflex member 7', a drive motor 9 therefor is provided at an end portion of a drive lever 8. An eccentric cam 10 is fixed to an output shaft of the drive motor 9 and the cam 10 is in contact with an end portion of the lever 8. In addition, the end portion of the drive lever 8 is normally biased toward the eccentric cam 10 by a spring or the like.

A focus detecting element module 11 into which light from both reflex members 7 and 7' is received is disposed between the fixed reflex member 7 and the movable reflex member 7'. The focus detecting element module 11 per se is well known and may, for example, be a focus detecting mechanism used in an auto-focus camera. When a focused image is obtained at the module from the light reflected from the left and right reflex members 7 and 7', a signal is generated to stop the motor 9 coupled to the movable reflex member 7' and simultaneously to stop the drive motor 5 coupled to the oculars cooperating with the drive motor 9. In front of the light admitting windows of the module 11 there are disposed long focus lenses or afocal optical system attachments 13 and 13' for narrowing the view field to a predetermined range. Reference numeral 12 denotes a receiving case for a battery for supplying current to the motors 5 and 9 which is formed within available space in the housing H.

The operation of the binoculars thus constructed will now be described. The light entering through the objectives 1 and 1' passes through the prism systems 2 and 2' and is focused by the ocular optical systems 3 and 3'. Initially, the focusing position of the objective lenses and the front focus position of the ocular lenses are generally not the same. However, with the present invention, since the left and right light admitting windows 6 and 6' are provided independently of the objectives, the light passing through the windows is introduced into the housing H through the fixed reflex member 7 or the movable reflex member 7' and the long focus optical systems or afocal optical system attachments 13 and 13'. In this case, since the movable reflex member 7' is always reciprocatingly moved by a mechanism such as the motor 9 and the drive lever 8 or the like, the image from the movable reflex member is caused to overlap with the image of the fixed reflex member 7. The movable reflex member 7' is thus reciprocated until overlap of the images is attained. At the time when the movable reflex member 7' is rotated through an angle in a predetermined proportion to the distance from the binoculars to the object, the above-described images are at identical positions. At that time, a focusing signal is produced by the module 11.

In the binoculars of the invention, it is to be noted that the field of the module 11 can be set as desired, such as to a narrow range, by the long focus optical systems or afocal optical systems 13 and 13'.

The oculars 3b and 3b' are moved according to the electronic control circuitry which operates in response to the distance to the object, namely, to the position corresponding to the angle of the movable reflex member 7' at the time when the two images are identical with each other, that is, at the same relative positions of the module 11. The ocular lenses are so constructed that the front focal position of the oculars is the same as the image formed by the objectives. Since the movements of the ocular lenses are controlled by the electronic circuitry, it is possible to start their movements immediately after the binoculars are pointed to the desired object or, alternatively, to start them after a certain time lapses using a memory circuitry.

Thus, the images focused by the oculars and introduced from the objectives are completely focused. By the repeated operation as above, the focused condition will be maintained even if the distance to the object is varied.

As is clear from the discussion above, since the binoculars constructed according to the present invention are provided with the long focus optical systems or afocal optical system attachments 13, 13', a narrow portion of the center of the binocular field is introduced to the module. With this construction, even if the object to be viewed is displaced within the center of the field and in case of the small object, it is possible to maintain proper focus. The view field control system disclosed herein can be applied to 8 mm cameras and other optical systems although the invention has been described as relating to binoculars.

What is claimed is:

1. Auto-focus binoculars, comprising:
  a viewing first optical system having first and second image paths each including an objective lens for receiving light from an object to be viewed and an ocular lens on the image side of said objective lens, said first optical system having a first view field angle;
  a focus detecting module disposed between said first and second optical paths for receiving light at first and second module inputs and for comparing said inputs and providing an output;
  a second optical system including third and fourth optical paths, said third optical path including a first light admitting window adjacent the objective lens of said first optical path and a first lens component for passing light from said first light admitting window to said first module input, said first lens component having a focal length substantially longer than a focal length of said objective lens in said first optical path, said fourth optical path including a second light admitting window adjacent the objective lens of said second optical path and a second lens component for passing light from said second light admitting window to said second module input, said second lens component having a focal length substantially longer than a focal length of said objective lens in said second optical path, whereby the field of view covered by said second optical system is substantially smaller than the field of view covered by said first optical system, and whereby the light entering said second optical system through said first and second light admitting windows is different from the light entering said first optical system through said objective lenses;
  means for adjusting said fourth optical path in accordance with said focus detecting module output to determine the distance between said binoculars and said object to be viewed; and
  means for moving said ocular lenses in accordance with said determined distance in order to automatically focus said binoculars on said object to be viewed.

2. The binoculars of claim 1, wherein said first and second lens components respectively comprise first and second long focal length lenses.

3. The binoculars of claim 1, wherein said first and second lens components comprise afocal lens components.

4. The binoculars of any one of claims 1, 2 or 3, wherein said first and second light admitting windows are disposed symmetrically with respect to a center line of said binoculars.

5. The binoculars of any one of claims 1, 2 or 3, wherein said first and second light admitting windows are disposed symmetrically with respect to a center line of said binoculars, and wherein said means for adjusting said fourth optical path comprises a movable reflective member disposed to receive light from said second light admitting window, said reflective member being movable in accordance with said determined distance for varying the position of an image reflected by said movable reflective member on said focus detecting module.

6. Auto-focus binoculars comprising right and left objective lenses; right and left ocular lenses, said right and left ocular lenses each including a movable lens element which is movable for focusing the image viewed through said ocular lenses; motor means for positioning said movable lens elements; right and left prism systems disposed, respectively, between said right and left objective lenses and said right and left ocular lenses; a focus detecting module; right and left light admitting windows disposed adjacent said right and left objective lenses, respectively, and symmetrically positioned with respect to said objective lenses; first and second long focal length lenses having focal lengths substantially longer than focal lengths of said right and left objective lenses, said long focal length lenses being disposed to focus images from light admitted through said right and left light admitting windows, respectively, onto said focus detecting module; a fixed reflex member for reflecting light from one of said light admitting windows through one of said long focal length lenses onto said focus detecting module; a movable reflex member for reflecting light from the other of said light admitting windows through the other of said long focal length lenses onto said focus detecting module; and motor means for positioning said movable reflex member in response to an output signal from said focus detecting module, wherein images focused on said focus detecting module through said right and left long focal length lenses are in a predetermined overlapping relationship when said image viewed through said ocular lenses is in focus, said motor means for moving said movable lens elements of said ocular lenses operating in response to said output signal.

7. The binoculars of claim 6 wherein said light admitting windows are positioned outside of said right and left objective lenses.

* * * * *